United States Patent
Lim et al.

(10) Patent No.: US 10,002,409 B2
(45) Date of Patent: Jun. 19, 2018

(54) IMAGE SIGNAL PROVIDING APPARATUS AND IMAGE SIGNAL PROVIDING METHOD

(71) Applicant: SAMSUNG ELECTRONICS CO., LTD., Suwon-si (KR)

(72) Inventors: Dae-sung Lim, Suwon-si (KR); Mun-gyu Kong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 15/154,070

(22) Filed: May 13, 2016

(65) Prior Publication Data
US 2016/0335752 A1    Nov. 17, 2016

(30) Foreign Application Priority Data
May 13, 2015    (KR) .................... 10-2015-0066552

(51) Int. Cl.
*G06F 17/30*    (2006.01)
*G06T 5/00*    (2006.01)
*G06T 7/246*    (2017.01)

(52) U.S. Cl.
CPC .............. *G06T 5/002* (2013.01); *G06T 7/246* (2017.01); *G06T 2207/10024* (2013.01)

(58) Field of Classification Search
CPC .......... G09G 5/02; G09G 3/2051; G09G 5/14; G09G 2340/10; G09G 2340/125; G09G 5/395; H04N 1/52; H04N 1/648; H04N 5/44504; G06F 3/14; G06T 5/002; G06T 7/246; G06T 11/001; G06T 11/60
See application file for complete search history.

(56) References Cited

U.S. PATENT DOCUMENTS

| 2002/0171764 A1* | 11/2002 | Hinson | H04L 12/2805 348/552 |
| 2007/0217704 A1* | 9/2007 | Zeng | H04N 19/70 382/244 |
| 2008/0174534 A1* | 7/2008 | Park | G09G 3/3648 345/87 |
| 2012/0249844 A1* | 10/2012 | Saito | H04N 5/2355 348/242 |
| 2013/0021350 A1* | 1/2013 | Schmit | H04N 19/44 345/506 |
| 2013/0142257 A1* | 6/2013 | Wang | H04N 19/50 375/240.12 |

(Continued)

FOREIGN PATENT DOCUMENTS

| JP | 2001-142437 A | 5/2001 |
| KR | 10-2004-0065615 A | 7/2004 |
| KR | 10-2008-0024860 A | 3/2008 |

*Primary Examiner* — Todd Buttram
(74) *Attorney, Agent, or Firm* — Sughrue Mion, PLLC (57) ABSTRACT

An image signal providing apparatus includes a signal separator which separates an inputted image signal into an upper bit and a lower bit, an upper bit image quality processor which performs image quality processing regarding an upper bit image signal, a compositor which combines the image-quality-processed upper bit image signal with a lower bit image signal and outputs the result, and a controller which controls the compositor to combine the image-quality-processed upper bit image signal with the lower bit image signal per area of the image signal based on image parameters regarding the image signal.

18 Claims, 7 Drawing Sheets

(56) References Cited

U.S. PATENT DOCUMENTS

2014/0301473 A1\* 10/2014 Park .................. H04N 19/58
　　　　　　　　　　　　　　　　　　　375/240.16
2015/0381911 A1\* 12/2015 Shen .................. H04N 5/3575
　　　　　　　　　　　　　　　　　　　348/241

\* cited by examiner

IMAGE SIGNAL PROVIDING APPARATUS AND IMAGE SIGNAL PROVIDING METHOD

CROSS-REFERENCE TO RELATED APPLICATIONS

This application claims priority from Korean Patent Application No. 10-2015-0066552, filed on May 13, 2015 in the Korean Intellectual Property Office, the disclosure of which is incorporated herein by reference in its entirety.

BACKGROUND

1. Field

Apparatuses and methods consistent with exemplary embodiments disclosed herein relate to an image signal providing apparatus and an image signal providing method thereof, and more specifically, to an image signal providing apparatus configured to provide an image signal processed for image quality and an image signal providing method thereof.

2. Description of the Related Art

The output accuracy of a display apparatus continuously increases as the display technology is developed. Therefore, certain new display apparatuses recently developed can express even 12-bit gray scale.

However, most current display support systems support the 10-bit output display apparatus, and high calculation accuracy is requested to modify the 10-bit output system into the 12-bit output system. Therefore, a problem may occur such as increased system complicacy, increased developing cost, and increased developing time for such modification.

For example, when a 10-bit image quality processing system is converted into a 12-bit image quality processing system in order to process the 12-bit image signal with the frame conversion image quality processing, the memory to store the frames may increase by 20%, calculation logics may increase by 20% following to the increase in the processed data amount, and the developing time may increase due to the design modification and the verification regarding the above.

Thus, a system is necessary, which receives incoming image signals of increased bits and maintains a related image quality processing calculation, and maintains the final output accuracy through a minimum system modification.

SUMMARY

Exemplary embodiments disclosed herein may overcome the above disadvantages and other disadvantages not described above. Also, the exemplary embodiments are not required to overcome the disadvantages described above, and an exemplary embodiment may not overcome any of the problems described above.

According to an exemplary embodiment, an image signal providing apparatus includes: a signal separator configured to separate an image signal into an upper bit image signal and a lower bit image signal; an upper bit image quality processor configured to perform image quality processing of the upper bit image signal; a compositor configured to combine the image-quality-processed upper bit image signal with the lower bit image signal and thereby output a result; and a controller configured to control the compositor to combine the image-quality-processed upper bit image signal with the lower bit image signal per area of the image signal based on image parameters of the image signal.

The controller may be configured to control the compositor to combine the image signal based on two or more image parameters among a first image parameter including information regarding a saturation area of the image signal, a second image parameter including information regarding a motion area of the image signal, and a third image parameter including information regarding a boundary area of the image signal.

The image signal providing apparatus may further include: a lower bit image quality processor configured to perform image quality processing of the lower bit image signal, wherein the controller may be configured to control the lower bit image quality processor to perform the image quality processing of the lower bit image signal based on the two or more image parameters, and may be configured to control the compositor to combine the image-quality-processed upper bit signal with the image-quality-processed lower bit image signal with respect to an area of the image signal corresponding to the two or more image parameters, and combine the image-quality-processed upper bit image signal with the lower bit image signal with respect to a remaining area of the image signal.

The lower bit image quality processor may be configured to perform at least one image quality processing operation among a smoothing operation for setting the lower bit image signal to be a certain value and an interpolating operation for setting the lower bit image signal with respect to a preset number of neighboring pixels to be a linear value, and the controller may be configured to control the lower bit image quality processor to perform the smoothing operation with respect to the lower bit image signal corresponding to the saturation area when the saturation area exists, perform the smoothing operation with respect to the lower bit image signal corresponding to the motion area when the motion area exists, and perform the interpolating operation based on the boundary area when the boundary area exists.

The image signal providing apparatus may further include: a first parameter generator configured to generate information regarding the saturation area by searching an area where the image-quality-processed upper bit image signal is equal to or greater than a preset maximum value, or equal to or less than a preset minimum value.

The image signal providing apparatus may further include: a second parameter generator configured to calculate a motion vector of the image signal and generate information regarding the motion area of the image signal by using the calculated motion vector.

The image signal providing apparatus may further include: a third parameter generator configured to generate information regarding the boundary area where certain values form a boundary, by searching a change in neighbored pixel values of the image-quality-processed upper bit image signal.

The image signal providing apparatus may further include: a dithering processor configured to perform a dithering operation with respect to the image signal by expanding the lower bit image signal from the image-quality-processed upper bit image signal, wherein the two or more image parameters include the third image parameter, and the controller may be configured to control the dithering processor to perform the dithering operation on the boundary area when the boundary area exists.

The image signal may be a YCbCr signal, and a number of upper bits and a number of the lower bits with respect a luminance component of the YCbCr signal are respectively different from a number of upper bits and a number of lower bits with respect to a color difference component of the YCbCr signal.

The image signal may be a 12-bit RGB image signal, the upper bit image signal may be a 10-bit RGB image signal from a most significant bit (MSB) of the 12-bit RGB image signal, and the lower bit image signal may be a 2 bit RGB image signal from a least significant bit (LSB) of the 12-bit RGB image signal.

The image signal providing apparatus may further include: a display configured to receive and display an image signal based on the result outputted from the compositor.

According to an aspect of another exemplary embodiment, an image signal providing method includes: separating an image signal into an upper bit image signal and a lower bit image signal; performing image quality processing of the upper bit image signal; and combining the image-quality-processed upper bit image signal with the lower bit image signal per area of the image signal based on image parameters of the image signal and outputting a result of the combining.

The combining and outputting may include combining the image signal based on two or more image parameters among a first image parameter including information regarding a saturation area of the image signal, a second image parameter including information regarding a motion area of the image signal, and a third image parameter including information regarding a boundary area of the image signal and outputting the result.

The image signal providing method may further include: performing image quality processing of the lower bit image signal based on the two or more image parameters, wherein the combining and outputting may include combining the image-quality-processed upper bit image signal with the image-quality-processed lower bit image signal with respect to an area of the image signal corresponding to the two or more image parameters, and combining the image-quality-processed upper bit image signal with a lower bit image signal with respect to a remaining area of the image signal and outputting the result.

The performing the image quality processing of the lower bit image signal may include performing at least one image quality processing operation among a smoothing operation for setting the lower bit image signal to be a certain value and an interpolating operation for setting the lower bit image signal with respect to a preset number of neighboring pixels to be a linear value, and the smoothing operation may be performed with respect to the lower bit image signal corresponding to the saturation area when the saturation area exists, the smoothing may be performed with respect to the lower bit image signal corresponding to the motion area when the motion area exists, and the interpolating operation may be performed based on the boundary area when the boundary area exists.

The image signal providing method may further include: generating information regarding the saturation area by searching an area where the image-quality-processed upper bit image signal is equal to or greater than a preset maximum value, or equal to or less than a preset minimum value.

The image signal providing method may further include: calculating a motion vector of the image signal and generating information regarding the motion area of the image signal by using the calculated motion vector.

The image signal providing method may further include: generating information regarding the boundary area where certain values form a boundary, by searching a change in neighboring pixel values of the image-quality-processed upper bit image signal.

The image parameter may include the third image parameter, and the image signal providing method may further include performing a dithering operation with respect to the boundary area by expanding the lower bit image signal from the image-quality-processed upper bit image signal corresponding to the boundary area when the boundary area exists.

The image signal may be a YCbCr signal, and a number of upper bits and a number of lower bits with respect to a luminance component of the YCbCr signal may be respectively different from a number of upper bits and a number of lower bits with respect to a color difference component of the YCbCr signal.

According to the above various exemplary embodiments, the output accuracy of the image signal of increased bit can be maintained through the minimum modifications regarding a related image quality processing system. Accordingly, a problem that may occur according to the development of a system for supporting the image quality processing regarding the image signal of increased bit can be solved.

BRIEF DESCRIPTION OF THE DRAWINGS

The above and/or other aspects of the exemplary embodiments will be more apparent by describing certain exemplary embodiments of the exemplary embodiments with reference to the accompanying drawings, in which.

DETAILED DESCRIPTION OF EXEMPLARY EMBODIMENTS

Certain exemplary embodiments of the exemplary embodiments will now be described in greater detail with reference to the accompanying drawings.

In the following description, same drawing reference numerals are used for the same elements even in different drawings. In providing the description, such as detailed construction and elements to assist in a comprehensive understanding of the exemplary embodiments, well-known functions or constructions are not described in detail since they would obscure the exemplary embodiments with unnecessary detail. Further, numeral expressions (e.g., first, second, and so on) may be used solely as an identifier to identify one element from another.

Figure 1:
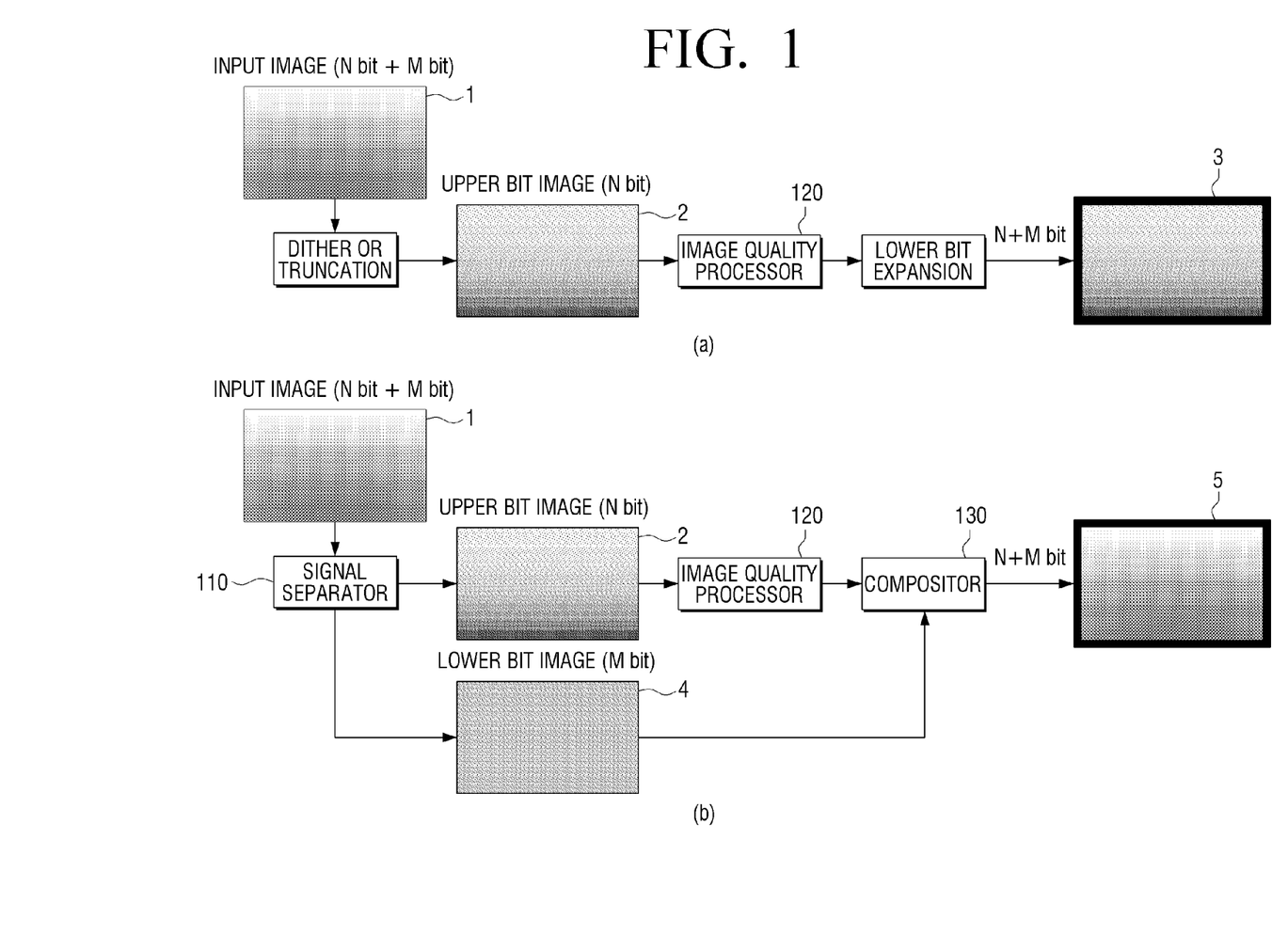
FIG. 1 is a concept view provided to compare and explain an image signal providing method according to an exemplary embodiment with a related image signal providing method.

FIG. 1 is a concept view provided to explain an image signal providing method according to an exemplary embodiment in comparison with a related image signal providing method. Referring to FIG. 1, an image quality processor 120 may perform the image quality processing such as contrast enhancement (CE), detail enhancement (DE), frame rate conversion (FRC), and scaling regarding the incoming image signal. Specifically, the image quality processor 120 may support the image quality processing of N bit image signal. Further, a display 3, 5 may support the displaying of N+M bit (N and M are natural numbers) image signal. For convenient explanation, it is assumed herein that N is 10 and M is 2. However, the number of upper bits and lower bits may not be limited to any specific example.

FIG. 1 illustrates a method for processing an inputted image signal when the image signal with increased output accuracy having 10 bits added to 2 bits, i.e., when 12-bit image signal 1 is inputted under the above circumstance. Because the image can be expressed in more stages as the number of bits increases, the output accuracy obviously increases.

In order to support the image quality processing regarding the image signal having the increased number of bits than the number of bits supported by the image quality processor 120, the related method may dither the inputted 12-bit image signal or truncate the added 2 bits, perform the image quality processing regarding the 10-bit image signal which are upper bits, and then expand the 2 lower bits from the 10-bit image-quality-processed image signal, and finally provide the 12-bit image signal to the display 3.

Regarding the above related method, the 12-bit image signal may be outputted by expanding the 2 lower bits which are dither-processed or truncation-processed from the image-quality-processed upper 10-bit image signal through various algorithms. Thus, the difference between the inputted 12-bit image signal 1 and the displayed 12-bit image signal 3 may occur. Although both the inputted image signal 1 and the displayed image signal 3 are 12-bit image signals, the output accuracy of the 12-bit image signal outputted through the expansion of the lower bits may decrease.

On the contrary, as illustrated in FIG. 1B, the inputted 12-bit image signal 1 may be separated into the upper 10-bit image signal 2 and the lower 2-bit image signal 4 by a signal separator 110, the separated upper 10-bit image signal 2 may be processed in terms of the image quality by the image quality processor 120, the upper 10-bit image signal that is image quality processed is added with the separated lower 2-bit image signal by a compositor 130, and the 12-bit image signal may be finally provided to the display 5.

In this case, loss of data included in the 2 lower bits can be minimized because the data of the lower 2-bit image signal is directly added to the image-quality-processed upper 10 bits. Thus, the output accuracy of the inputted 12-bit image signal 1 can be maintained to the maximum on the displayed image signal 5.

Figure 2:
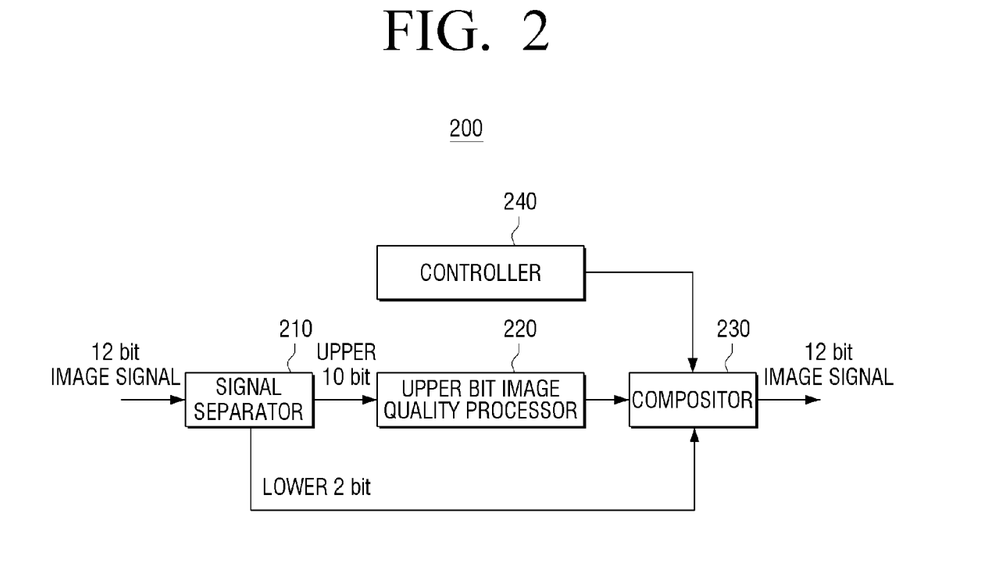
FIG. 2 is a block diagram illustrating an image signal providing apparatus according to an exemplary embodiment.

The following description will specifically address operation of an image signal providing apparatus according to various exemplary embodiments. FIG. 2 is a block diagram of an image signal providing apparatus according to an exemplary embodiment. Referring to FIG. 2, the image signal providing apparatus 200 includes a signal separator 210, an upper bit image quality processor 220, a compositor 230, and a controller 240.

The signal separator 210 may separate incoming image signal into upper bits and lower bits. Specifically, the signal separator 210 may separate a preset number of bits as upper bit image signal from the most significant bits (MSB) among the whole bits of the inputted image signal, and separate the rest bits including the least significant bits (LSB) as lower bit image signal.

In this case, the preset number may be the number of the processed bits supported by the upper bit image quality processor 220, although exemplary embodiments are not limited thereto. The preset number may be smaller than the number of the processed bits.

For example, when the inputted image signal is 12-bit image signal and the number of the processed bits supported by the upper bit image quality processor 220 is 10, in other words, when the image signal having the output accuracy of the increased 12 bits is inputted to the 10 bit image quality processing system, the signal separator 210 may separate 10 bits as upper bit image signal from the most significant bits (MSB), and separate 2 bits as lower bit image signal from the least significant bits (LSB).

However, exemplary embodiments are not limited thereto. That is, because the upper bit image quality processor 220 can process 10 bits at the maximum in terms of the image quality, the signal separator 210 may separate the upper 8 bits as upper bit image signal and separate the rest 4 bits as lower bit image signal according to an exemplary embodiment.

The upper bit image quality processor 220 may perform various image quality processing regarding the inputted image signal. The type of the image quality processing may not be limited. For example, the upper bit image quality processor 220 may perform the image quality processing such as CE, DE, FRC, and scaling, although exemplary embodiments are not limited thereto.

Specifically, the upper bit image quality processor 220 may be provided with the separated upper bit image signal from the signal separator 210, perform various image quality processing regarding the upper bit image signal, and provide the image-quality-processed upper bit image signal to the compositor 230 or the controller 240.

For example, when the inputted image signal is 12-bit image signal and the upper bit image quality processor 220 supports the 10 bit image quality processing, the upper bit image quality processor 220 may perform the image quality processing regarding the upper 10-bit image signal, and provide the 10-bit image signal processed in terms of the image quality to the compositor 230 or the controller 240 if the upper 10-bit image signal is provided from the signal separator 210.

Meanwhile, various image quality processing performed on the inputted upper bit image signal with the upper bit image quality processor 220 will not be specifically explained herein because it may be out of the scope of the disclosure.

The compositor 230 may combine the image-quality-processed upper bit image signal provided from the image quality processor 220 with the lower bit image signal separated from the signal separator 220, and output the result externally. In the embodiment described above, the compositor 230 may combine the image-quality-processed upper 10-bit image signal with the lower 2-bit image signal separated from the signal separator 210, and output the 12-bit image signal to an external display.

At this process, the external display may have the performance suitable to process the number of bits of the inputted image signal. Thus, the external display can express the gray scale corresponding to number of bits of the inputted image signal. For example, when the inputted image signal is 12-bit image signal, the external display may also express the 12-bit image signal.

Meanwhile, under controlling of the controller 240, the compositor 230 may combine the upper bit image signal with the lower bit image signal per area of the image signal and output the combined image signal, as described below.

The controller 240 may control the compositor to combine the upper bit image signal with the lower bit image signal per area of the image signal based on the image parameter regarding the image signal. In one example, the image parameter regarding the image signal may be at least one of a first parameter including information regarding saturation area of the image signal, a second parameter including information regarding motion area of the image signal, and a third parameter including information regarding boundary area of the image signal.

In one example, the saturation area may indicate area where the image signal value is equal to or greater than a preset maximum value, or equal to or less than a preset minimum value, and the motion area may indicate area where the motion vector value measured with a known method is equal to or greater than a preset value, i.e., the area where the motion occurs in the image.

Meanwhile, the number of bits of the image-quality-processed upper bit is less than the number of bits of the outputted image signal. In other words, the gray scale of the upper bit is smaller than the gray scale of the inputted image signal or the gray scale that can be expressed by the external display. Thus, when the image-quality-processed upper bit image signal is outputted to the external display, the boundary area such as striped pattern may be generated.

In this case, the contour area such as striped pattern generated from the difference between the number of bits of the upper bit image signal and the number of bits of the inputted image signal may be referred to as a 'boundary area'. Thus, the boundary area may indicate the boundary between the two areas when the areas having different certain values to each other on the image-quality-processed upper bit image signal are neighbored, and a difference value between the image signals of the two areas may be within a preset range. In one example, the difference value may be limited to be within a preset range for distinguishing the boundary area between the objects included in the image signals from the above described boundary area. This is because the difference value on the boundary between the objects may be mostly greater than the difference value of the boundary area generated from the gray scale difference described above.

Meanwhile, the image signal may be any one of the inputted image signal or the image-quality-processed upper bit image signal. Thus, the information of the saturation area, the information of the motion area and the information of the boundary area may be information of the saturation area, the motion area and the boundary area of the inputted image signal, or information of the saturation area, the motion area, and the boundary area of the image-quality-processed upper bit image signal.

Meanwhile, the controller 240 may control the compositor to combine a preset value regarding the saturation area based on the saturation area information included in the first image parameter, instead of combining the image-quality-processed upper bit image signal with the separated lower bit image signal.

For example, when the inputted image signal is 12 bits, the upper bit image signal is 10 bits, and the lower bit image signal is 2 bits, the controller 240 may control the compositor 230 to set the lower bits to be 0 or 1, without adding the lower 2-bit image signal to the upper 10-bit image signal regarding the pixels included in the saturation area.

Further, the controller 240 may control the compositor to combine a preset value regarding the motion area based on the motion area information included in the second image parameter, without combining the image-quality-processed upper bit image signal with the separated lower bit image signal. Under the circumstance of the above embodiment, the controller 240 may control the compositor 230 to set the lower bit to be 0 or 1, without adding the lower 2-bit image signal to the upper 10-bit image signal regarding the pixels included in the motion area.

Further, the controller 240 may control the compositor to combine a preset value regarding the boundary area based on the boundary area information included in the third image parameter, without combining the image-quality-processed upper bit image signal with the separated lower bit image signal. Under the circumstance of the above embodiment, the controller 240 may control the compositor 230 to set the lower 2-bit image signal to be a linearly increasing or decreasing value regarding a preset number of the image signal based on the boundary area, and to respectively add the lower 2 bit to the image-quality-processed upper 10 bits.

Meanwhile, the controller 240 may obtain the image parameters by separately including first to third parameter generator, as described below with reference to FIG. 3, or obtain the image parameters from an external device, as described below with reference to FIG. 4.

Figure 3:
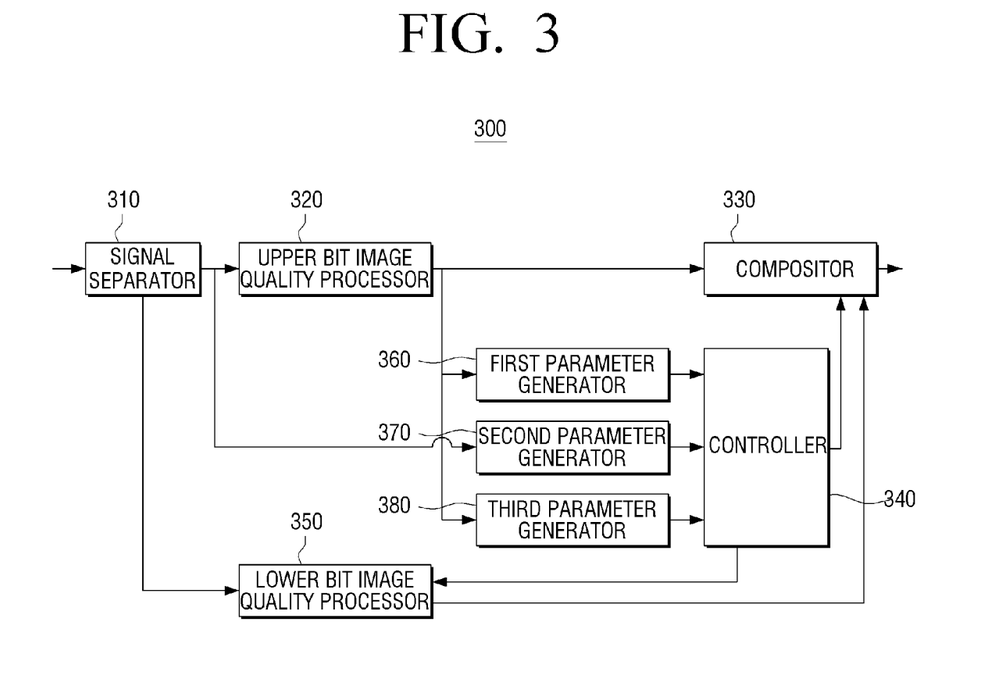
FIG. 3 is a block diagram illustrating an image signal providing apparatus generating first to third parameters according to an exemplary embodiment.

FIG. 3 is a block diagram illustrating constitution of the image signal providing apparatus according to another exemplary embodiment. Referring to FIG. 3, the image signal providing apparatus 300 may include the signal separator 310, the upper bit image quality processor 320, the compositor 330, the controller 340, a lower bit image quality processor 350, the first parameter generator 360, the second parameter generator 370, and the third parameter generator 380.

Constitution and operation of the signal separator 310 and the upper bit image quality processor 320 are uniform to the constitution and the operation of the signal separator 210 and the upper bit image quality processor 220 in the image signal providing apparatus 200 of FIG. 2, which will not be further explained herein for the sake of brevity.

The lower bit image quality processor 350 may perform the image quality processing regarding the lower bits separated in the signal separator 310. Specifically, the lower bit image quality processor 350 may perform at least one processing, under controlling of the controller, among the smoothing for setting the lower bits to be certain values and the interpolating for setting the lower bits regarding a preset number of the neighbored pixels to be linear values.

For example, when the inputted 12-bit image signal is separated into the upper 10-bit image signal and the lower 2-bit image signal by the signal separator 310, the lower bit image quality processor 350 may perform the smoothing by setting the lower 2 bit values to be 00 or 11. Further, the lower bit image quality processor 350 may perform the interpolating to linearly increase or decrease the lower bit values of the four neighbored pixels such as 00, 01, 10, 11 or 11, 10, 01, 00.

The first parameter generator 360 may generate the first parameter including the information regarding the saturation area by searching the saturation area on the image signal. Specifically, the first parameter generator 360 may generate the information regarding the saturation area by searching the area where the image signal value is equal to or greater than a preset maximum value or equal to or less than a preset minimum value on the image-quality-processed upper bit image signal. In one example, the information regarding the saturation area may include the coordinate of each pixel included in the saturation area and the information regarding whether the saturation area is included in the whole image signal.

The second parameter generator 370 may generate the second parameter including the information regarding the motion area by using the motion vector of the image signal. Specifically, the second parameter generator 370 may calculate the motion vector from the upper bit image signal separated in the signal separator 310 as illustrated in FIG. 3, and generate the information regarding the motion area by using the calculated motion vector.

For example, the second parameter generator 370 may calculate the motion vector including the information regarding the size and the direction of the object movement included in the image signal by comparing the separated upper bit image signal of a previous image frame with the separated upper bit image signal of a current image frame. Further, the second parameter generator 370 may generate the information regarding the motion area where the object moves by using the information regarding the size and the direction of the object movement included in the motion vector.

Meanwhile, according to another exemplary embodiment, the second parameter generator 370 may generate the information regarding the motion area by calculating the motion vector from the image-quality-processed upper bit image signal in the upper bit image quality processor 320, differently from FIG. 3.

The third parameter generator 380 may generate the third parameter including the information regarding the boundary area by searching the change in neighbored pixels of the image signal. Specifically, the third parameter generator 380 may generate the information regarding the boundary area where certain values form a boundary, by searching the changes in the values of the neighbored pixels from the image-quality-processed upper bit image signal in the upper bit image quality processor 320, as illustrated in FIG. 3. In one example, the information regarding the boundary area may include the coordinate of the pixels forming to be boundary, the direction of the boundary, the coordinate regarding a preset number of pixels toward the vertical or the horizontal direction based on the boundary.

The controller 340 may control the operation of the lower bit image quality processor 350 based on the generated image parameters described above. Specifically, when the saturation area is determined to be confirmed on the image signal according to the first parameter value, the controller 340 may control the lower bit image quality processor 350 to perform the smoothing regarding the lower bit image signal corresponding to the saturation area.

Further, when the motion area is determined to be confirmed on the image signal according to the second parameter value, the controller 340 may control the lower bit image quality processor 350 to perform the smoothing regarding the lower bit image signal corresponding to the motion area.

Further, when the boundary area is determined to be confirmed on the image signal according to the third parameter value, the controller 340 may control the lower bit image quality processor 350 to perform the interpolating based on the boundary area. In one example, a number or the direction of the pixels to be interpolated may be differently set.

For example, when there is boundary area toward the vertical direction, the controller 340 may control the lower bit image quality processor 350 to perform the interpolating regarding x number of the pixels toward the left side and x number of the pixels toward the right side based on the boundary, or control the lower bit image quality processor 350 to perform the interpolating regarding 2× number of the pixels toward the right side or 2× number of the pixels toward the left side. In one example, when a certain value of the left side area image signal is equal to or greater than a certain value of the right side area image signal based on the boundary, the controller 340 may control the lower bit image quality processor 350 to have 2× number of the lower bit values which linearly decrease from the left side to the right side. However, this is merely one of exemplary embodiments; the lower bit image signal values on the boundary area may be processed with various methods for minimizing the change in the image value signal on the boundary area.

Meanwhile, the controller 340 may control the compositor 330 to combine the image-quality-processed upper bit image signal with the lower bit image signal per area based on the image parameters. Specifically, the saturation area is area where the image signal value is equal to or greater than a preset value or equal to or less than a preset value. Even when the lower bit value added to the upper bit value changes in the saturation area, the change may not be expressed with the gray scale change. Thus, when the saturation area is determined to be confirmed according to the first parameter, the controller 340 may control the compositor 330 to combine the lower bit image signal in which the smoothing is processed in the lower bit image quality processor 350 with the image-quality-processed upper bit image signal regarding the saturation area.

The motion area may have the object movement. Thus, even when the lower bit value added to the upper bit value changes in the motion area, the change may be difficult to be recognized by a user. When the motion area is determined to be confirmed according to the second parameter, the controller 340 may control the compositor 330 to combine the lower bit image signal in which the smoothing is processed in the lower bit image quality processor 350 with the image-quality-processed upper bit image signal regarding the motion area where there is movement.

The boundary area indicates discontinuous line that can be generated because the processed number of bits supported by the upper bit image quality processor 320 is smaller than the number of bits of the inputted image signal, as described above. Thus, the change between the neighbored two areas should be minimized by adding the properly processed lower bit to the upper bit regarding the boundary area. Therefore, when the boundary area is determined to be confirmed according to the third parameter, the controller 340 may control the compositor 330 to combine the lower bit image signal in which the interpolating is processed in the lower bit image quality processor 350 with the image-quality-processed upper bit image signal regarding the boundary area.

Meanwhile, the controller 340 may control the compositor 330 to combine the image-quality-processed upper bit image signal with the lower bit image signal separated in the signal separator 310 regarding the area other than the saturation area, the motion area and the boundary area.

Thereby, the controller 340 may combine the image-quality-processed upper bit image signal with the lower bit image signal per area of the image signal based on the image parameters generated in the first to third parameters generator 360, 370, 380.

Meanwhile, although FIG. 3 exemplifies that the first to third parameters generator 360, 370, 380 are all included, exemplary embodiments are not limited thereto. At least one of the first to third parameters generator may be included according to an exemplary embodiment. Further, at least one image parameter among the first to third parameters may be provided from the external device 20, as described below with reference to FIG. 4.

Figure 4:
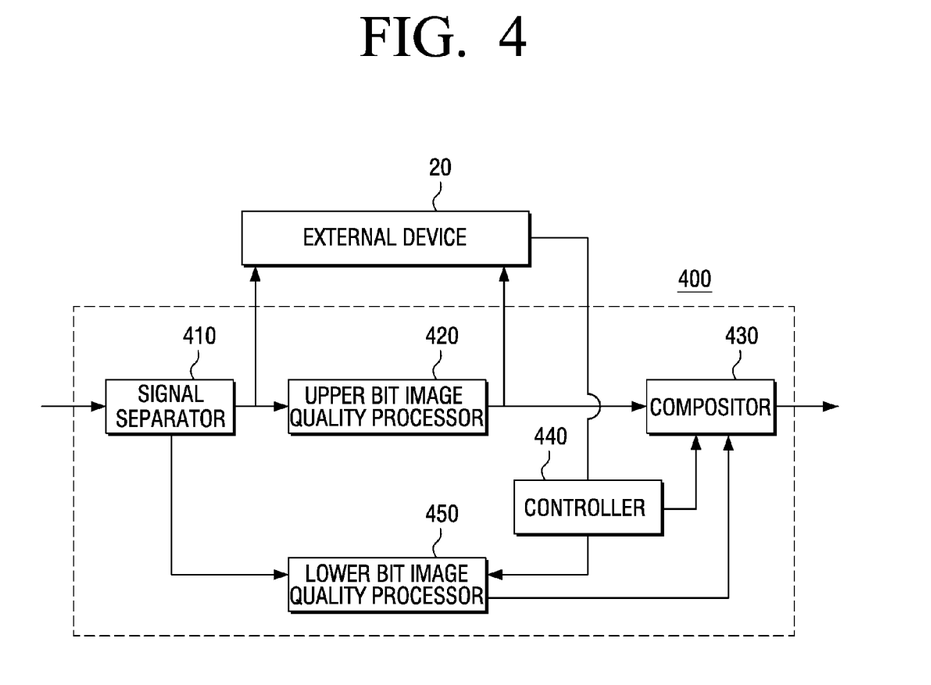
FIG. 4 is a block diagram illustrating an image signal providing apparatus obtaining first to third parameters from an external device according to an exemplary embodiment.

FIG. 4 is a block diagram of the image signal providing apparatus which obtains the first to third parameters from the external device according to an exemplary embodiment. Referring to FIG. 4, the image signal providing apparatus 400 may include the signal separator 410, the upper bit image quality processor 420, the compositor 430, the controller 440 and the lower bit image quality processor 450. The constitution except for the controller 440 illustrated in FIG. 4 is uniform to the constitution explained in FIGS. 2 to 3, which will not be further explained below for the sake of brevity.

The controller 440 of the image signal providing apparatus 400 illustrated in FIG. 4 may perform the operation of the controller 340 in FIG. 3 by receiving the first to third parameters from the external device 20.

Specifically, the external device 20 may receive the upper bit image signal separated in the signal separator 410 of the image signal providing apparatus 400 and the image-quality-processed upper bit image signal in the upper bit image quality processor 420 from the image signal providing apparatus 400, and generate the first to third parameters by performing the operation of the first to third parameters generators 360, 370, 380 in FIG. 3. Further, the external device 20 may provide the generated first to third parameters to the controller 440 of the image signal providing apparatus 400. In one example, the external device 20 may be one of various external processors including an application processor, although exemplary embodiments are not limited thereto.

Thereby, the controller 440 may control the operation of the lower bit image quality processor 450 based on the first to third parameters or control the compositor 430 to combine the image-quality-processed upper bit image signal with the lower bit image signal per area of the image signal.

Figure 5:
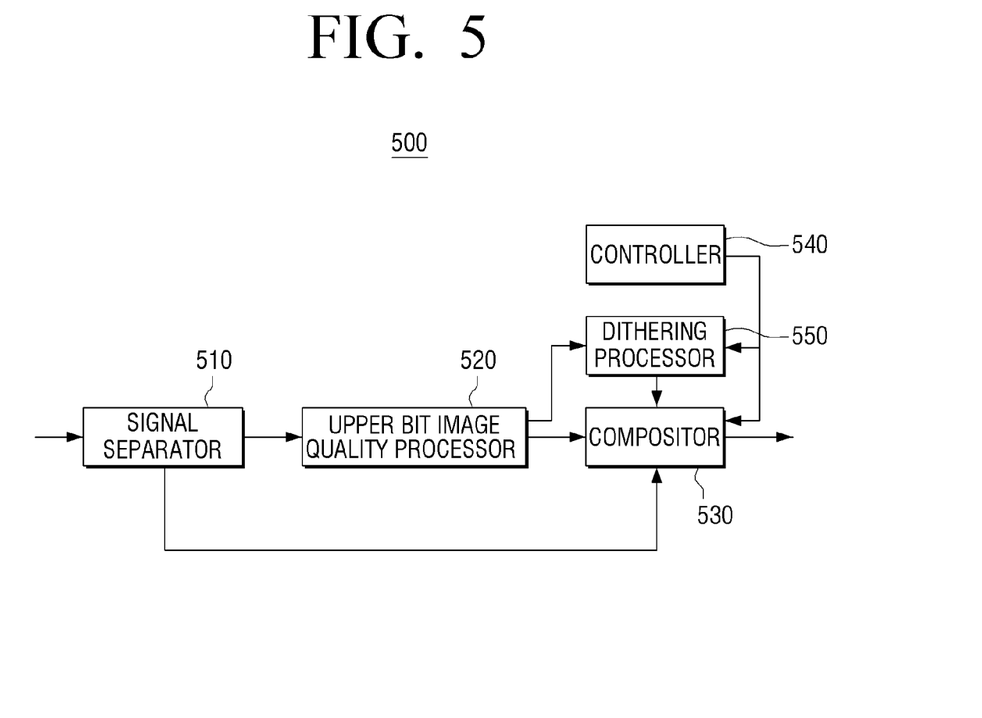
FIG. 5 is a block diagram illustrating an image signal providing apparatus including a dithering processor according to an exemplary embodiment.

FIG. 5 is a block diagram illustrating the image signal providing apparatus including a dithering processor according to an exemplary embodiment. Referring to FIG. 5, the image signal providing apparatus 500 may include the signal separator 510, the upper bit image quality processor 520, the compositor 530, the controller 540 and the dithering processor 550. The constitution except for the controller 540 and the dithering processor 550 of the image signal providing apparatus 500 illustrated in FIG. 5 is uniform to the constitution explained in FIGS. 2 to 3, which will not be further explained below for the sake of brevity.

The dithering processor 550 may perform the dithering regarding the inputted image signal. Specifically, the dithering processor 550 may generate the lower bit image signal from the image-quality-processed upper bit image signal in the upper bit image quality processor 520 and provide to the compositor 530, under controlling of the controller 540. Thereby, the compositor 530 may add the lower bit image signal generated in the dithering processor 530 to the image-quality-processed upper bit image signal and output a uniform number of bits of the image signal to the number of bits of the inputted image signal. In one example, the lower bit generated in the dithering processor 550 may be generated through the known dithering algorithms differently from the lower bit separated in the signal separator 510.

Meanwhile, according to another exemplary embodiment, the dithering processor 550 may expand the lower bit image signal in the image-quality-processed upper bit image signal and directly output to the external display without passing through the compositor, under controlling of the controller 540.

When the boundary area is determined to be confirmed on the image signal according to the third parameter, the controller 540 may control the dithering processor 550 to perform the dithering regarding the image signal corresponding to the boundary area. In one example, regarding the area other than the boundary area, the lower bit image signal separated from the signal separator 510 may be added to the image-quality-processed upper bit image signal.

Further, the controller 540 may perform the uniform operation to that of the controller 240 in FIG. 2 regarding the first and the second parameter. Further, the dithering processor 550 may be also included in the image signal providing apparatus 300, 400 in FIGS. 3 and 4. Regarding the first and the second parameter, the controller 540 may perform the uniform operation to that of the controller 340, 440 in FIGS. 3 and 4.

Meanwhile, the inputted image signal may be RGB signal or YCbCr signal in the above exemplary embodiments. According to an exemplary embodiment, when the inputted image signal is YCbCr signal, numbers of the upper bit and the lower bit regarding the luminance signal (Y signal) may be respectively different from numbers of the upper bit and the lower bit regarding the color difference signal (Cb, Cr). Regarding YCbCr signal, the information included in the luminance signal may be determined to be more important than the information included in the color signal in terms of expressing the image.

For example, when the inputted image signal is 12 bits, the luminance signal may be separated into upper 10-bit image signal from the most significant bit (MSB) and lower 2-bit image signal from the least significant bit (LSB), and the color signal may be separated into upper 8 bit image signal from the most significant bit (MSB) and lower 4 bit image signal from least significant bit (LSB).

Further, when the inputted image signal is RGB image signal, number of bits of the upper bit image signal and number of bits of the lower bit image signal may be uniform to each other respectively regarding R, G, B. For example, when the inputted image signal is 12-bit image signal, R signal, G signal and B signal may be separated uniformly into upper 10-bit image signal and lower 2-bit image signal. However, exemplary embodiments are not limited to any specific examples.

Meanwhile, the above explaining that the inputted image signal is 12 bits, the upper bit image signal is 10 bits and the lower bit image signal is 2 bits is merely one of exemplary embodiments. When the number of bits of the inputted image signal or the number of bits supported by the external display receiving the outputting of the compositor is equal to or greater than a processed number of bits supported by the upper bit image quality processor, the technical essence of the exemplary embodiments can be applied even if number of bits of the inputted image signal, the upper bit image signal and the lower bit image signal become different.

Meanwhile, the constitutions of the image signal providing apparatus 200, 300, 400, 500 described above may be respectively implemented to be various formats by combining RTL (Register-Transfer Logic) or the processor. For example, the constitution except for the controller 240, 340, 440, 540 may be constituted to be hardware by using RTL, the controller may be constituted to be processor, and the whole constitution may be implemented to be one SoC chip format. Although not illustrated, the controller 240, 340, 440, 540 may be implemented to be connected to the other units and control the other units of the constitution.

Further, although the above does not explain a storage (not illustrated), the image signal providing apparatus 200, 300, 400, 500 may store various pieces of information such as inputted image signal, upper bit image signal, lower bit image signal, information to generate the first to the third image parameter, information regarding the generated image parameter, and information to process the image quality of various upper bits and lower bits in the storage (not illustrated), and perform the above described various operation by reading the information according to necessity. In one example, the storage (not illustrated) may not be necessarily one unit.

Further, the image signal providing apparatus 200, 300, 400, 500 according to the various exemplary embodiments may be constituted to be one display apparatus (not illustrated) with the external display receiving and displaying the image signal outputted from the compositor 230, 330, 430, 530 (e.g., see a drawing reference numeral, 5, of FIG. 1B). In this case, the display may be implemented to be various formats of the display such as liquid crystal display (LCD), organic light emitting diodes (OLEDs), and plasma display panel (PDP). Further, the display may include a touch screen. The display apparatus may be also TV, smart phone, tablet PC, notebook, desktop PC, electronic frame, monitor, projector, table-format display, and large format display (LFD). However, exemplary embodiments are not limited to any specific examples.

Meanwhile, although the above exemplifies that the first to third parameters may be respectively determined, another exemplary embodiment may be contemplated, in which it is determined whether to process the lower bit image quality by respectively putting a weight on the parameters and adding the parameters can be implemented. For example, when the saturation area or the motion area is equal to or greater than 50 percent of the whole image signal area, another exemplary embodiment of performing the smoothing regarding the whole image signal can be implemented.

Figure 6:
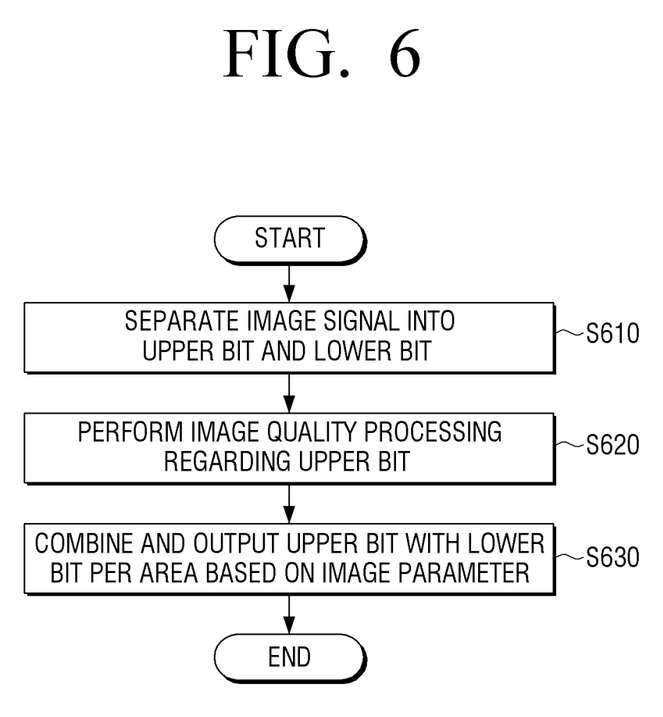
FIG. 6 is a flowchart provided to explain an image signal providing method according to an exemplary embodiment.
Figure 7:
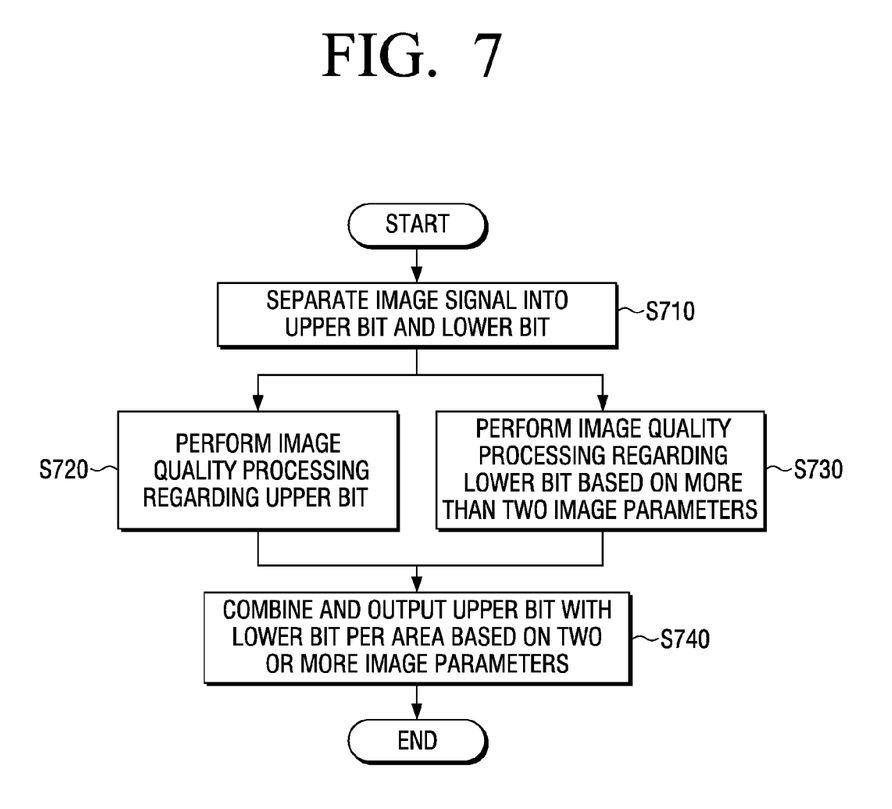
FIG. 7 is a flowchart provided to explain an image signal providing method according to another exemplary embodiment.

A following will explain an image signal providing method according to various exemplary embodiments by referring to FIGS. 6 and 7. Although the image signal providing method will be explained through the operation of the image signal providing apparatus 200, 300, 400, 500, the image signal providing method may not be limited to herein.

FIG. 6 is a flowchart provided to explain the image signal providing method according to an exemplary embodiment. Referring to FIG. 6, the image signal providing apparatus may separate the inputted image signal into the upper bit and the lower bit at S610. At this process, the inputted image signal may be 12-bit RGB image signal, the upper bit may be 10-bit RGB image signal from the most significant bit (MSB) among the above 12-bit image signal, and the lower bit may be 2 bit RGB image signal from the least significant bit (LSB) among the above 12-bit image signal.

Further, according to another exemplary embodiment, the inputted image signal may be YCbCr signal. In this case, numbers of the upper bit and the lower bit regarding the luminance signal may be respectively different from numbers of the upper bit and the lower bit regarding the color difference signal.

Thereby, the image signal providing apparatus may perform the image quality processing according to the separated upper bit image signal at S620. The image quality processing regarding the upper bit image signal may include CE, DE, FRC, and the scaling, although exemplary embodiments are not limited thereto.

At S630, the image signal providing apparatus may combine the image-quality-processed upper bit image signal with the separated lower bit image signal per area of the image signal based on the image parameter regarding the image signal, and output the result to the external display. The image parameter may be any one of the first parameter including the information regarding the saturation area of the image signal, the second parameter including the information regarding the motion area of the image signal, and the third parameter including the information regarding the boundary area of the image signal.

Meanwhile, according to the various exemplary embodiments, the image signal providing apparatus may search the area where the image-quality-processed upper bit image signal value is equal to or greater than a preset maximum value or equal to or less than a preset minimum value, and generate the information regarding the saturation area. Further, the image signal providing apparatus may calculate the motion vector of the inputted image signal, and generate the information regarding the motion area of the image signal by using the calculated motion vector. Further, the image signal providing apparatus may search the change in neighbored pixel values of the image-quality-processed upper bit image signal and generate the information regarding the boundary area where certain values form to be boundary.

At this process, the information regarding the saturation area, the information regarding the motion area, and the information regarding the boundary area may be generated in an external device such as application processor, and provided to the image signal providing apparatus 300.

Further, according to an exemplary embodiment, the image signal providing apparatus may combine and output the image signal based on two or more parameters among the first to the third parameter.

FIG. 7 is a flowchart provided to explain the image signal providing method according to another exemplary embodiment. Referring to FIG. 7, the image signal providing apparatus may first separate the inputted image signal into the upper bit and the lower bit at S710. Thereafter, the image signal providing apparatus may perform the image quality processing regarding the separated upper bit image signal at S720, and perform the image quality processing regarding the separated lower bit image signal based on two or more image parameters at S730.

Specifically, the image signal providing apparatus may perform at least one image quality processing among the smoothing for setting the separated lower bit to be certain values and the interpolating for setting the lower bit regarding a preset number of the neighbored pixels to be linear values. When there is saturation area, the smoothing may be performed regarding the lower bit corresponding to the saturation area. When there is motion area, the smoothing may be performed regarding the lower bit corresponding to the motion area. Further, when there is boundary area, the interpolating may be performed based on the boundary area.

At S740, the image signal providing apparatus may combine the upper bit with the lower bit per area of the image signal based on two or more image parameters and output the result. In one example, the image signal providing apparatus may combine the image-quality-processed upper bit with the image-quality-processed lower bit regarding the area of the inputted image signal corresponding to two or more image parameters, while combining the image-quality-processed upper bit with the non-image-quality-processed separated lower bit regarding the rest area of the inputted image signal and outputting the result.

Meanwhile, according to another exemplary embodiment, when the boundary area is determined to be confirmed according to the second parameter, the image signal providing apparatus may perform the dithering on the boundary area by expanding the lower bit image signal from the upper bit image signal corresponding to the boundary area in which the image quality is processed.

According to the above various exemplary embodiments, the output accuracy of the image signal by the increased bit can be maintained through the minimum revision regarding a related image quality processing system. Thereby, a problem according to the development of a system supporting the image quality processing on the image signal by the increased bit can be solved.

Meanwhile, as described above, when the controller of the image signal providing apparatus is implemented to control all the other units of the constitution, the image signal providing method according to the above various exemplary embodiments may be generated to be software and loaded on an image signal providing apparatus. For example, a non-transitory computer readable medium may be installed, storing a program for performing an image signal providing method including separating an inputted image signal into the upper bit and the lower bit, performing the image quality processing on the upper bit image signal, and combining the image-quality-processed upper bit image signal with the lower bit image signal per area of the image signal based on the image parameter regarding the image signal and the outputting the result.

The non-transitory computer readable recording medium indicates a medium which stores data semi-permanently and can be read by devices, rather than a medium storing data temporarily, such as register, cache, or memory. Specifically, the above various applications or programs may be stored and provided in a non-transitory computer readable recording medium such as CD, DVD, hard disk, Blu-ray disk, USB, memory card, or ROM.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims.

What is claimed is:

1. An image signal providing apparatus, comprising:
    a signal separator configured to separate an image signal into an upper bit image signal and a lower bit image signal;
    an upper bit image quality processor configured to perform image quality processing of the upper bit image signal;
    a compositor configured to combine the image-quality-processed upper bit image signal with the lower bit image signal and output a combined image signal; and
    a controller configured to control the compositor to combine the image-quality-processed upper bit image signal with the lower bit image signal per area of the image signal based on image parameters of the image signal,
    wherein the controller is configured to control the compositor to combine the image-quality-processed upper bit image signal with the lower bit image signal based on two or more image parameters among a first image parameter including information regarding a saturation area of the image signal, a second image parameter including information regarding a motion area of the image signal, and a third image parameter including information regarding a boundary area of the image signal.

2. The image signal providing apparatus of claim 1, further comprising:
    a lower bit image quality processor configured to perform image quality processing of the lower bit image signal,
    wherein the controller is configured to control the lower bit image quality processor to perform the image quality processing of the lower bit image signal based on the two or more image parameters, and
    is configured to control the compositor to combine the image-quality-processed upper bit signal with the image-quality-processed lower bit image signal with respect to an area of the image signal corresponding to the two or more image parameters, and combine the image-quality-processed upper bit image signal with the lower bit image signal with respect to a remaining area of the image signal.

3. The image signal providing apparatus of claim 2, wherein the lower bit image quality processor is configured to perform at least one image quality processing operation among a smoothing operation for setting the lower bit image signal to be a certain value and an interpolating operation for setting the lower bit image signal with respect to a preset number of neighboring pixels to be a linear value, and
    the controller is configured to control the lower bit image quality processor to perform the smoothing operation with respect to the lower bit image signal corresponding to the saturation area when the saturation area exists, perform the smoothing operation with respect to the lower bit image signal corresponding to the motion area when the motion area exists, and perform the interpolating operation based on the boundary area when the boundary area exists.

4. The image signal providing apparatus of claim 1, further comprising:
    a first parameter generator configured to generate information regarding the saturation area by searching an area where the image-quality-processed upper bit image signal is equal to or greater than a preset maximum value, or equal to or less than a preset minimum value.

5. The image signal providing apparatus of claim 1, further comprising:
    a second parameter generator configured to calculate a motion vector of the image signal and generate information regarding the motion area of the image signal by using the calculated motion vector.

6. The image signal providing apparatus of claim 1, further comprising:
    a third parameter generator configured to generate information regarding the boundary area where certain values form a boundary, by searching a change in neighbored pixel values of the image-quality-processed upper bit image signal.

7. The image signal providing apparatus of claim 1, further comprising:
    a dithering processor configured to perform a dithering operation with respect to the image signal by expanding the lower bit image signal from the image-quality-processed upper bit image signal,
    wherein the two or more image parameters comprise the third image parameter, and the controller is configured to control the dithering processor to perform the dithering operation on the boundary area when the boundary area exists.

8. The image signal providing apparatus of claim 1, wherein the image signal is a YCbCr (Luminance, Chrominance blue, and Chrominance red) signal, and
a number of upper bits and a number of lower bits with respect a luminance component of the YCbCr signal are respectively different from a number of upper bits and a number of lower bits with respect to a color difference component of the YCbCr signal.

9. The image signal providing apparatus of claim 1, wherein the image signal is a 12-bit RGB (Red, Green, and Blue) image signal,
the upper bit image signal is a 10-bit RGB image signal from a most significant bit (MSB) of the 12-bit RGB image signal, and
the lower bit image signal is a 2 bit RGB image signal from a least significant bit (LSB) of the 12-bit RGB image signal.

10. The image signal providing apparatus of claim 1, further comprising:
a display configured to receive and display an image signal based on the combined image signal.

11. An image signal providing method, comprising:
separating an image signal into an upper bit image signal and a lower bit image signal;
performing image quality processing of the upper bit image signal; and
combining the image-quality-processed upper bit image signal with the lower bit image signal per area of the image signal based on image parameters of the image signal and outputting a combined image signal,
wherein the combining and outputting comprises combining the image-quality-processed upper bit image signal with the lower bit image signal based on two or more image parameters among a first image parameter including information regarding a saturation area of the image signal, a second image parameter including information regarding a motion area of the image signal, and a third image parameter including information regarding a boundary area of the image signal and outputting the combined image signal.

12. The image signal providing method of claim 11, further comprising:
performing image quality processing of the lower bit image signal based on the two or more image parameters,
wherein the combining and outputting comprises combining the image-quality-processed upper bit image signal with the image-quality-processed lower bit image signal with respect to an area of the image signal corresponding to the two or more image parameters, and combining the image-quality-processed upper bit image signal with a lower bit image signal with respect to a remaining area of the image signal and outputting the combined image signal.

13. The image signal providing method of claim 12, wherein the performing the image quality processing of the lower bit image signal comprises performing at least one image quality processing operation among a smoothing operation for setting the lower bit image signal to be a certain value and an interpolating operation for setting the lower bit image signal with respect to a preset number of neighboring pixels to be a linear value, and
the smoothing operation is performed with respect to the lower bit image signal corresponding to the saturation area when the saturation area exists, the smoothing operation is performed with respect to the lower bit image signal corresponding to the motion area when the motion area exists, and the interpolating operation is performed based on the boundary area when the boundary area exists.

14. The image signal providing method of claim 11, further comprising:
generating information regarding the saturation area by searching an area where the image-quality-processed upper bit image signal is equal to or greater than a preset maximum value, or equal to or less than a preset minimum value.

15. The image signal providing method of claim 1, further comprising:
calculating a motion vector of the image signal and generating information regarding the motion area of the image signal by using the calculated motion vector.

16. The image signal providing method of claim 11, further comprising:
generating information regarding the boundary area where certain values form a boundary, by searching a change in neighboring pixel values of the image-quality-processed upper bit image signal.

17. The image signal providing method of claim 11, wherein the two or more image parameters comprises the third image parameter, and the image signal providing method further comprises performing a dithering operation with respect to the boundary area by expanding the lower bit image signal from the image-quality-processed upper bit image signal corresponding to the boundary area when the boundary area exists.

18. The image signal providing method of claim 11, wherein the image signal is a YCbCr (Luminance, Chrominance blue, and Chrominance red) signal, and a number of upper bits and a number of lower bits with respect to a luminance component of the YCbCr signal are respectively different from a number of upper bits and a number of lower bits with respect to a color difference component of the YCbCr signal.

* * * * *